US010682586B2

(12) United States Patent
Downe

(10) Patent No.: US 10,682,586 B2
(45) Date of Patent: Jun. 16, 2020

(54) DEVICES, SYSTEMS AND METHODS FOR CAPTURING ENERGY IN DISTILLING OPERATIONS

(71) Applicant: Quinton Downe, Calgary (CA)

(72) Inventor: Quinton Downe, Calgary (CA)

(*) Notice: Subject to any disclaimer, the term of this patent is extended or adjusted under 35 U.S.C. 154(b) by 0 days.

(21) Appl. No.: 16/151,088

(22) Filed: Oct. 3, 2018

(65) Prior Publication Data

US 2019/0099690 A1 Apr. 4, 2019

Related U.S. Application Data

(60) Provisional application No. 62/567,309, filed on Oct. 3, 2017.

(30) Foreign Application Priority Data

Oct. 3, 2017 (CA) ..................................... 2981389

(51) Int. Cl.
| | |
|---|---|
| *B01D 3/00* | (2006.01) |
| *C12C 11/00* | (2006.01) |
| *F03B 3/04* | (2006.01) |
| *C12F 3/06* | (2006.01) |
| *F03B 13/00* | (2006.01) |

(Continued)

(52) U.S. Cl.
CPC ............. *B01D 3/007* (2013.01); *B01D 3/004* (2013.01); *B01D 3/02* (2013.01); *B01D 5/006* (2013.01); *C12C 11/006* (2013.01); *C12F 3/06* (2013.01); *F03B 3/04* (2013.01); *F03B 13/00* (2013.01);

(Continued)

(58) Field of Classification Search
CPC ........ B01D 3/004; B01D 3/006; B01D 3/007; B01D 3/02; F03B 3/04; F03B 13/00; C12C 11/006; C12F 3/06
See application file for complete search history.

(56) References Cited

U.S. PATENT DOCUMENTS

| | | |
|---|---|---|
| 3,486,743 A | 12/1969 | Todd |
| 4,019,962 A | 4/1977 | Allen et al. |

(Continued)

*Primary Examiner* — Brian A McCaig
(74) *Attorney, Agent, or Firm* — Antony C. Edwards

(57) ABSTRACT

A device is provided having a fermentation chamber having one or more inlets to receive a mixed stream to be fermented and an outlet to release fermented product; a distillation vessel surrounding the fermentation chamber having communication with the fermentation chamber outlet to receive fermented product to be distilled and a turbine located within the outlet of the fermentation chamber, the turbine having a rotor rotatable by force of flow of fermented product from the fermentation chamber to the distillation vessel, to generate electricity. A sidewall common to both the fermentation chamber and distillation vessel allows for heat transfer of heat generated from fermentation to the distillation vessel to heat the product to be distilled. A method of fermenting and distilling a product is also provided. The method involves receiving in a fermentation chamber a mixed stream to be fermented; transferring heat energy generated by fermentation to a distillation vessel surrounding the fermentation chamber; allowing pressurized fermented product to flow from the fermentation chamber into the distillation vessel via a turbine and rotating a rotor of the turbine by a force of flow of the fermented product to the distiller to generate electricity.

17 Claims, 8 Drawing Sheets

(51) Int. Cl.
  *B01D 3/02* (2006.01)
  *B01D 5/00* (2006.01)
(52) U.S. Cl.
  CPC ...... *C12C 2200/00* (2013.01); *F05B 2210/13* (2013.01); *F05B 2220/602* (2013.01)

(56) References Cited

U.S. PATENT DOCUMENTS

| | | |
|---|---|---|
| 4,276,384 A | 6/1981 | Mueller |
| 4,424,275 A | 1/1984 | Levy |
| 4,670,397 A | 6/1987 | Wegner et al. |
| 4,891,318 A | 1/1990 | Oosterhuis et al. |
| 5,258,293 A | 11/1993 | Lynd et al. |
| 5,733,758 A | 3/1998 | Nguyen |
| 6,045,660 A | 4/2000 | Woodie |
| 6,136,577 A | 10/2000 | Gaddy |
| 6,398,918 B1 | 6/2002 | Popov et al. |
| 6,660,509 B1 | 12/2003 | Herman et al. |
| 7,649,086 B2 | 1/2010 | Belanger et al. |
| 7,985,847 B2 | 7/2011 | Belanger et al. |
| 8,309,694 B2 | 11/2012 | Belanger et al. |
| 8,815,552 B2 | 8/2014 | Narendranath et al. |
| 8,822,657 B2 | 9/2014 | Belanger et al. |
| 2007/0117195 A1 | 5/2007 | Warner et al. |
| 2008/0277264 A1 | 11/2008 | Sprague |
| 2008/0299628 A1 | 12/2008 | Hallberg et al. |
| 2009/0017512 A1 | 1/2009 | May et al. |
| 2011/0003355 A1 | 1/2011 | Clark et al. |
| 2011/0059497 A1 | 3/2011 | Beckler Andersen et al. |
| 2012/0122164 A1 | 5/2012 | El-Shafie |
| 2012/0151827 A1 | 6/2012 | Powell et al. |
| 2013/0152457 A1 | 6/2013 | Powell et al. |
| 2013/0309738 A1 | 11/2013 | Barr et al. |
| 2014/0073021 A1 | 3/2014 | Bazzana et al. |
| 2014/0073820 A1 | 3/2014 | Bazzana et al. |
| 2014/0311889 A1* | 10/2014 | Zaher ............... B01D 3/002 203/42 |

\* cited by examiner

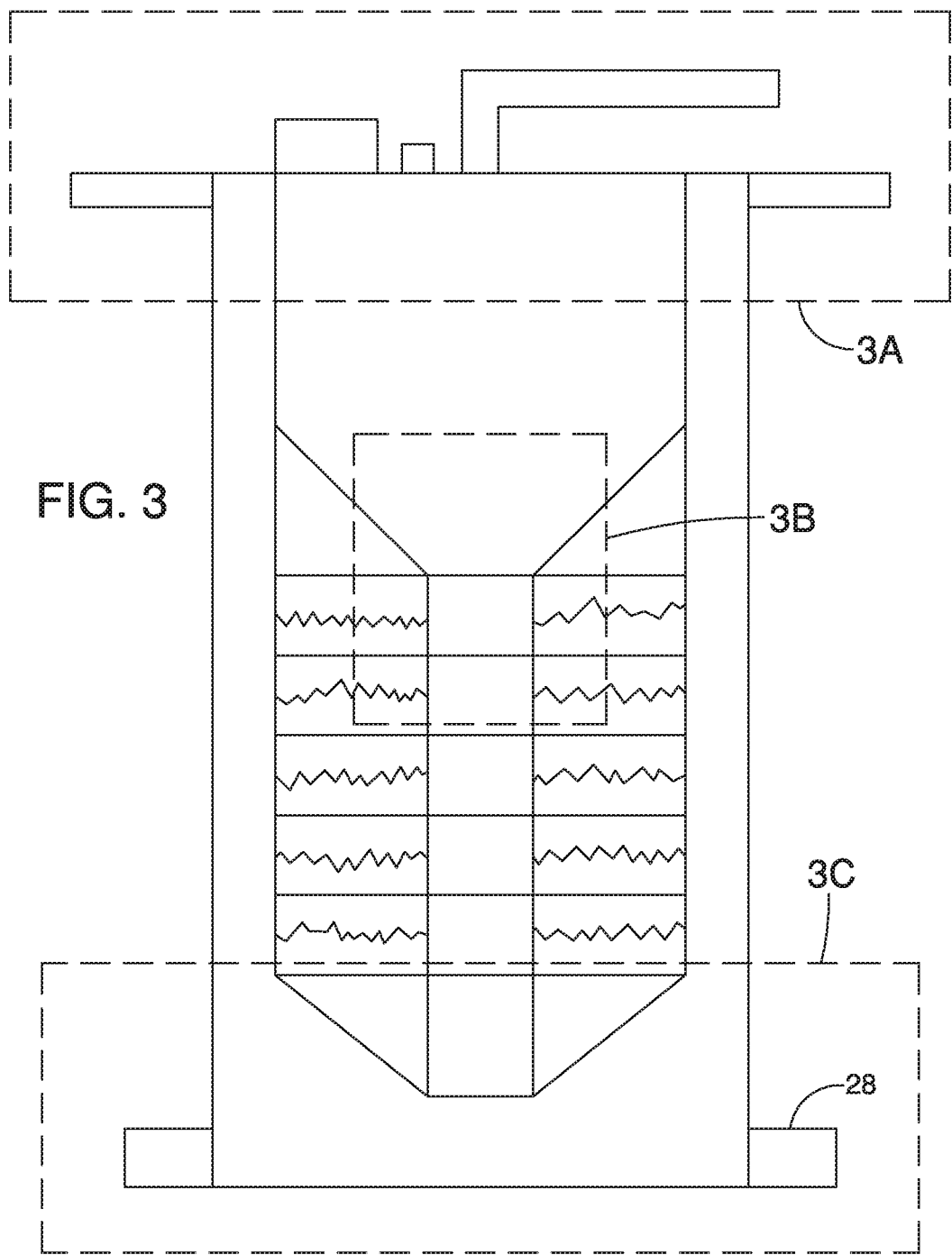

DEVICES, SYSTEMS AND METHODS FOR CAPTURING ENERGY IN DISTILLING OPERATIONS

CROSS REFERENCE TO RELATED APPLICATION

This application claims priority from U.S. Provisional Application No. 62/567,309, filed Oct. 3, 2017, entitled "Devices, Systems and Methods for Capturing Energy in Distilling Operations" and Canadian Patent Application No. 2,981,389, filed Oct. 3, 2017, entitled: "Devices, Systems and Methods for Capturing Energy in Distilling Operations", entireties of which are incorporated herein by reference.

FIELD OF THE INVENTION

The present invention relates to a device for capturing and utilizing fermentation heat and mechanical energy in a distilling process. The present invention further relates to a system including the present device and methods of fermentation and distillation.

BACKGROUND

In the traditional distilled spirits industry, the process of fermenting a mash so as to produce a water/alcohol mixture, and then further distilling that water/alcohol mixture so as to produce the alcoholic beverage or product, is a process which consumes a high amount of energy. Because fermentation is an exothermic process, electrical or other energy must be applied to cool the fermentation vat and keep it at an ideal temperature. Furthermore, the distillation of the water/alcohol mixture, which typically takes place in an apparatus that is separate from the fermentation vat, requires the application of heat to the mixture, so as to boil the alcohol and thereby separate it from the water. These energy requirements increase the cost and environmental impact of the traditional brewing process.

Systems are known for fermentation and distillation that involve heat exchange systems for transferring excess heat from one part of the process to another part of the process. The following patents show some examples of prior art systems for fermenting and distilling:

US Publication No. 2007/0117195 discloses a method for treating organic wastes to produce fuel that can be used as an energy source. Organic wastes are separated into high and low moisture content streams. The high moisture content undergoes a biocatalytic fermentation process and produces both ethanol and water. The low moisture content stream undergoes a gasification process. A heat exchanger is provided to capture waste heat from the gasifier and convey it to the biocatalytic process, for example by heating water from a water source. The heat exchanger may also be used to provide heat to a distillation column for separating water from ethanol produced in the fermentation process.

U.S. Pat. No. 8,815,552 discloses a biorefinery and a system for producing ethanol in a fermentation system from biomass that has been pre-treated and separated into a first component and a second component. Product of fermentation is distilled to recover ethanol, but does not include a heat exchange system for collecting heat from fermentation unit and transferring that heat to the distillation unit.

US Publication No. 2012/0151827 and related US Publication No. 2013/0152457 describe a digestion unit and method for processing cellulosic biomass using integrated heat management for process control. More efficient heat integration is realized by coupling a digestion unit and catalytic reduction reactor unit together in a fluid circulation loop. Catalytic reduction reactions such as hydrogenation and/or hydrogenolysis are exothermic processes that may supply their excess generated heat to the endothermic digestion process when these processes are coupled together in a fluid circulation loop, thereby reducing the need for external heat input to drive the digestion process, and providing an efficient use of the excess heat generated by the catalytic reduction reaction, which would otherwise need to be dissipated.

US Publication No. 2009/0017512 discloses compositions, methods, and apparatus for the production of electricity, ethanol and hydrogen from biomass. Electricity is generated by supplying a microbial catalyst and a fuel source to a microbial fuel cell or a bioelectrochemically assisted microbial reactor.

However, none of the references disclose an apparatus which combines a fermentation tank and a distillation chamber into one unit for the purposes of heat transfer and energy production.

SUMMARY

The present invention provides a device that combines fermentation and distillation apparatuses into a single device, so as to reduce the overall energy required to accomplish the fermentation and distillation.

In one embodiment, the present invention provides a device comprising;
a) a fermentation chamber having one or more inlets to receive a mixed stream to be fermented and an outlet to release fermented product;
b) a distillation vessel surrounding the fermentation chamber having communication with the fermentation chamber outlet to receive fermented product to be distilled; and
c) a turbine located within the outlet of the fermentation chamber, the turbine having a rotor rotatable by force of flow of fermented product from the fermentation chamber to the distillation vessel, to generate electricity;
wherein a sidewall of the fermentation chamber allows for heat transfer of heat generated from fermentation to the distillation vessel to heat the product to be distilled.

The invention further provides a method of fermenting and distilling a product, the method comprising the steps of:
a) receiving in a fermentation chamber a mixed stream to be fermented;
b) transferring heat energy generated by fermentation to a distillation vessel surrounding the fermentation chamber; and
c) allowing pressurized fermented product to flow from the fermentation chamber into the distillation vessel via a turbine to thereby rotate a rotor of the turbine by the force of the flow of the fermented product to the distillation vessel so as to generate electricity.

The present invention further provides an ethanol producing system comprising a combined fermenter and distillation unit. The present invention further still provides methods for capturing and transferring energy in fermentation and distillation processes.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings:

FIG. 3 is a cross section elevation view of one embodiment of the device of the present invention;

FIG. 4A (ii) is an elevation view of a stack of four spindle arms of FIG. 4A (i)

FIG. 4B (ii) is an elevation view of a stack of eight impellers of FIG. 4B (i)

Figure 1A:
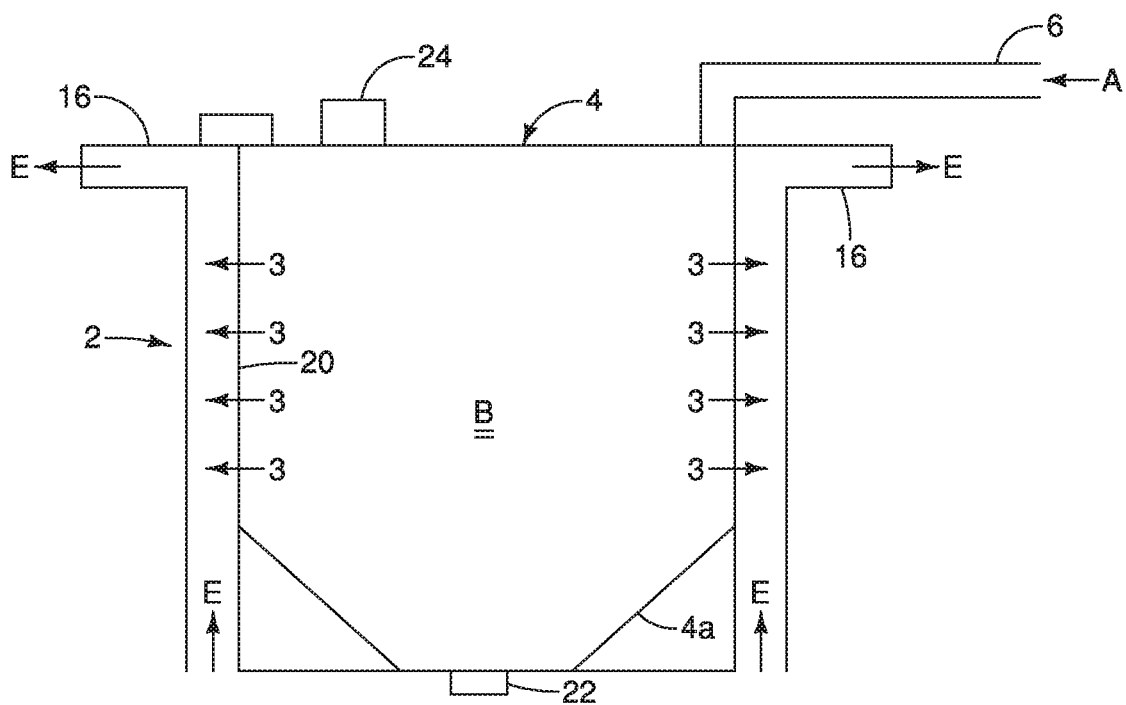
FIG. 1A is a cross sectional elevation view of one embodiment of the present device.

The drawing is not necessarily to scale and in some instances proportions may have been exaggerated in order more clearly to depict certain features.

DETAILED DESCRIPTION OF VARIOUS EMBODIMENTS

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

The present invention provides a combined fermentation chamber and distillation vessel for fermenting and distilling alcohol.

Figure 1B:
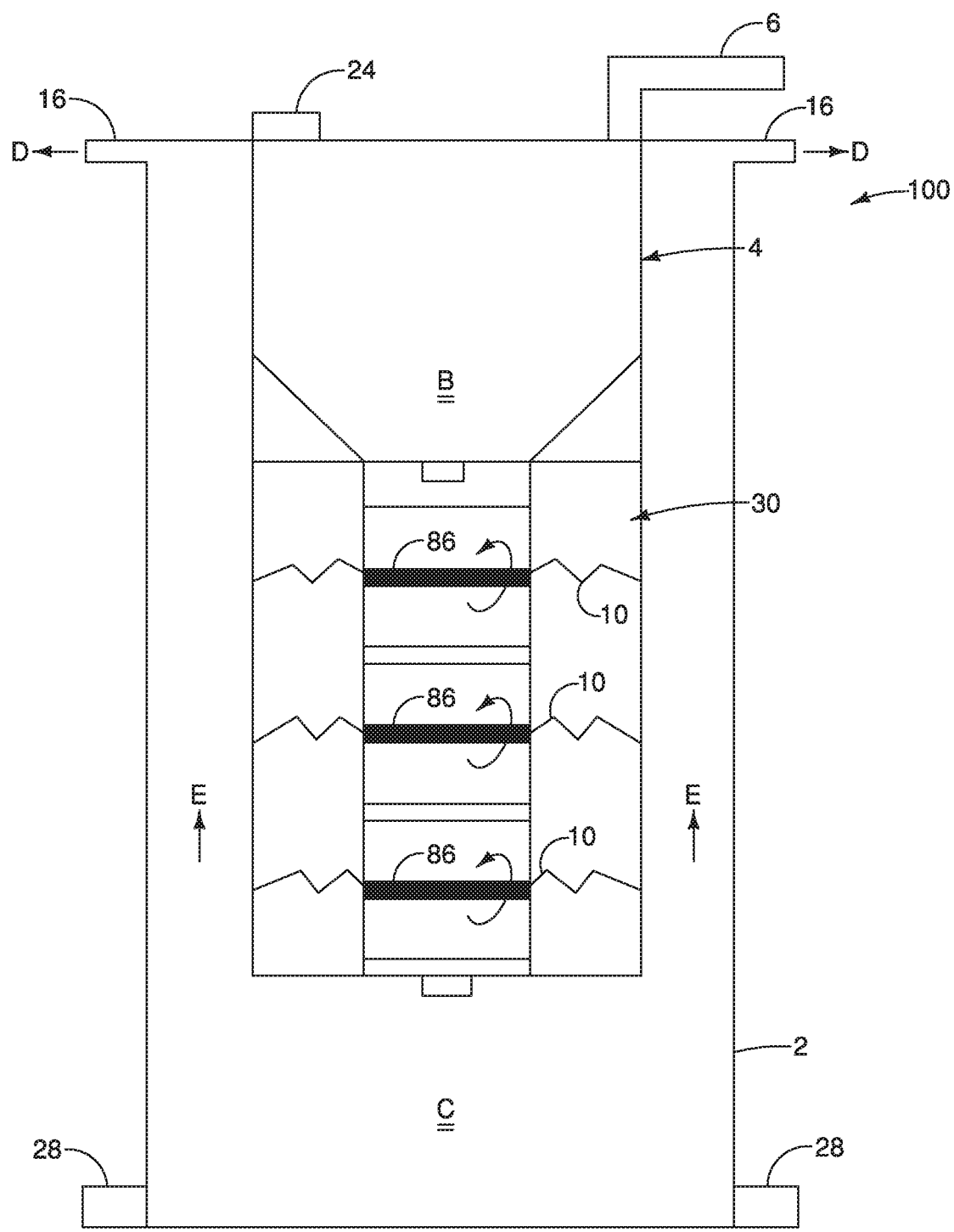
FIG. 1B is a further detailed view of the device of FIG. 1A.
Figure 1C:
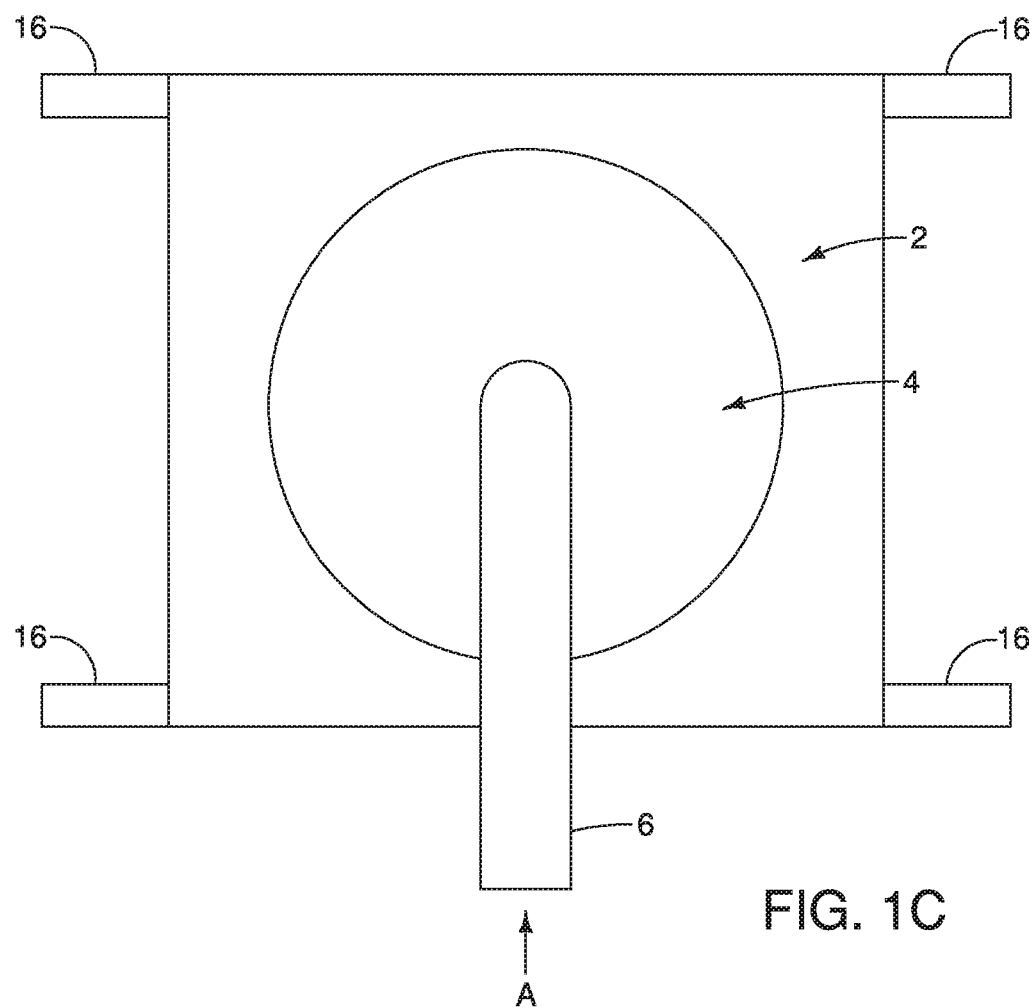
FIG. 1C is a top plan view of the device of FIG. 1A.
Figure 2:
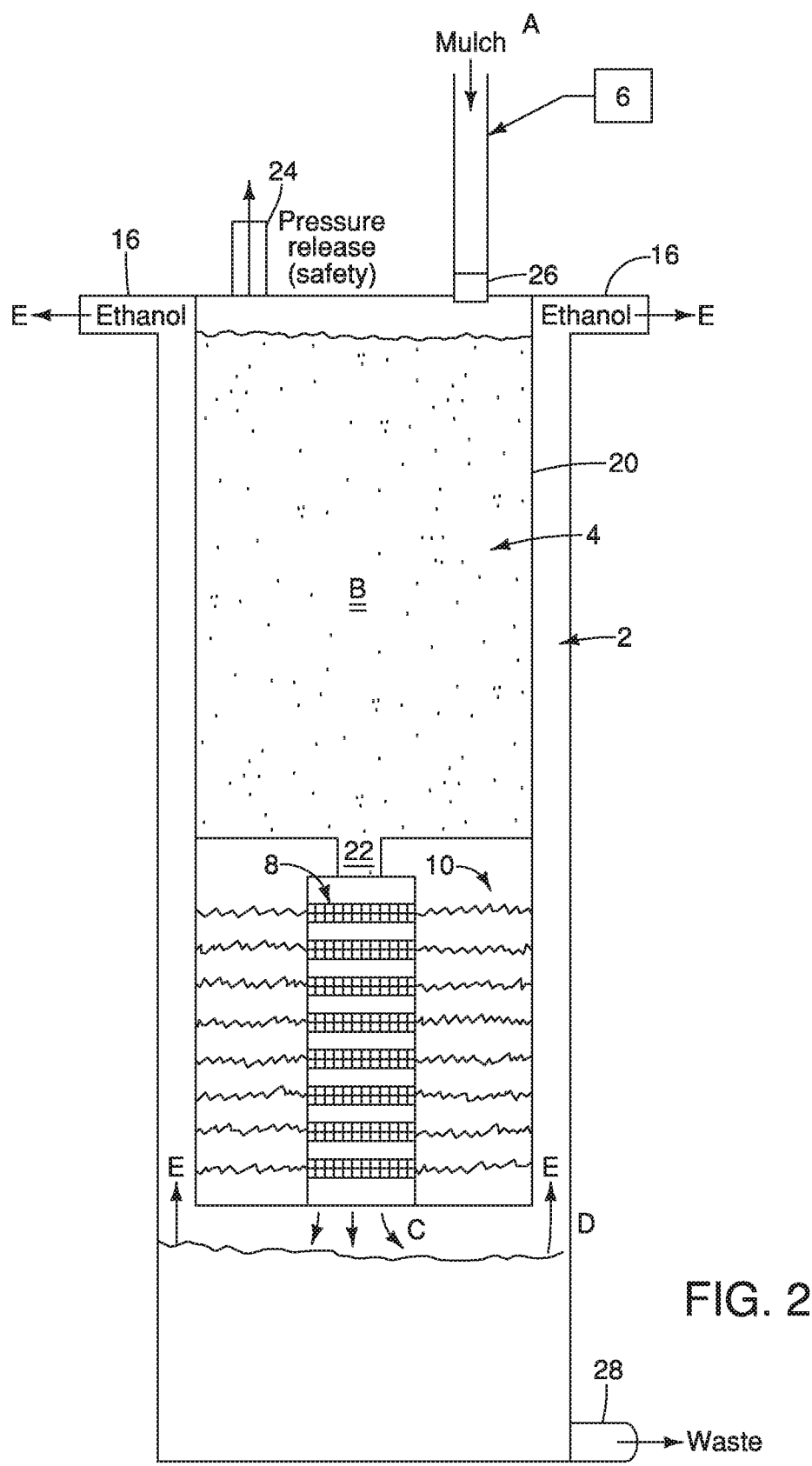
FIG. 2 shows a second embodiment of the present device.

As seen in FIG. 1A, mash or mulch A is fed into a fermentation chamber 4, which is surrounded by a distillation vessel 2. As seen in FIG. 1B, once the mash A ferments in the fermentation chamber, it generates ethanol D and heat. Heat transfers through the fermentation chamber walls 20 (made for example from copper) to the interior of the distillation vessel, thereby heating the interior of the distillation vessel. When sufficient pressure builds in the fermentation chamber, a valve opens (not shown) to release the fermented mash/ethanol mixture B into the distillation vessel, causing a rotor of a turbine to turn as the fermented mash/ethanol mixture B passes through into the distillation vessel, thereby converting the mechanical energy of the flow fermented mash/ethanol mixture B into electricity via a generator driven by the turbine. Once the fermented mash/ethanol mixture B is in the heated distillation vessel, the ethanol D is distilled from the mash A and released into an ethanol collector (not shown). As seen in FIG. 2, a pressure release valve 24 releases pressure from the fermentation chamber if the pressure rises to dangerous levels.

The combined fermentation/distillation unit 100 is advantageous over typical separate fermentation chambers and distillation vessels since there is no need to apply a separate energy source to the distillation chamber to heat the mixture and distill the ethanol D. Advantageously in this combined unit 100, the heat generated by the fermentation process is applied to heat the distillation process, making the overall process more energy efficient. Furthermore, the electricity generated by the falling mash A may be used to power other parts of the process, such as cooling the fermentation tanks when they get too hot.

With reference to the Figures, one embodiment of the fermentation/distillation unit 100 is depicted, having a fermentation chamber 4 inside a distillation vessel 2. The fermentation chamber 4 has at least one inlet 6 for introduction of the mash A to be fermented. The fermentation chamber 4 has a sidewall 20 that is conductive and allows heat transfer. The fermentation chamber 4 and its walls on sidewalls 20 are preferably made of copper or for example may be copper plated. Sidewalls 20 may be a single wall if for example cylindrically shaped.

The fermentation chamber 4 can be designed and built to fit inside the distillation vessel 2 in any number of ways or configurations so long as room is provided to accommodate the fermented mash/ethanol mixture B flowing from the fermentation chamber 2 and so that sufficient space is provided for distilled ethanol D to rise and separate from the fermented mash, for collection. The fermentation chamber 4 and distillation vessel 2 may be nested, for example with vessel 2 formed as a sleeve around chamber 4 to maximize heat transfer from the fermentation chamber 4 to the distillation vessel 2.

With reference to FIG. 1B, the heat transfer from the fermentation chamber 4 to the distillation vessel 2 is depicted by arrows 3. Although arrows 3 are used in the depiction, it is understood that the heat transfer would be uniform through the area of sidewalls 20. As the mash A is fermented, a heat of fermentation is created and transferred through sidewall 20 to the distillation vessel 2, thereby serving to cool the fermentation chamber 4 and to heat the distillation vessel 2. The fermented mash/ethanol mixture B falls by gravity from the fermentation chamber through outlet 22. The fermented mash/ethanol mixture B from outlet 22 flows through a turbine 8 which drives a generator 10. The turbine 8 preferably has spindle rotors 8a. The generator 10 may be housed in a chamber 30 located within the shell of the fermentation chamber 4, but isolated from any contact with the mash. The chamber 30 mass also advantageously house wiring and other electrical componentry. As seen in the Figures, chamber 30 may be adjacent the rotors 8a and below the outlet 22 of the fermentation chamber 4. It will be understood by a person skilled in the art that generator 10 may be located outside of the fermentation/distillation unit 100. For example, rotor shafts driven by the rotors of one or more fermentation/distillation units 100 may be connected to one or more external generators 10 (not shown).

FIG. 1B illustrates the fermented mash/ethanol mixture B falling by gravity from outlet 22 as an outfall C into a receiving area in the distillation vessel 2. It will be understood by a person of skill in the art that the force of pressure from the pressurized fermentation chamber 2 may drive mixture B with sufficient force to rotate the rotor 8 while pushing the fermented mash/ethanol mixture B from the lower end 4a of fermentation chamber 4 and into the distillation vessel 2. As such, other orientations of the present fermentation/distillation unit 100 are possible that do not depend on gravity flow. However, the presently illustrated arrangement, which takes advantage of both the force of pressure and force of gravity, is preferred.

Outfall C accumulates as fermented mash/ethanol mixture B in the distillation vessel 2 and is heated from the transferred heat of fermentation. The transferred heat evaporates ethanol D. Distilled ethanol D evaporates from the fermented mash/ethanol mixture B in the distillation vessel 2 and exits the unit via one or more vapour outlets 16.

The mash A received by the fermentation chamber 4 via inlet 6 is typically a mixed stream of yeast, sugar and water. It will be understood by a person of skill in the art that any number of components of the mash A may be present depending on the desired final fermented and distilled product. As seen in FIG. 2, an optional valve 26 may be opened to allow feeding of the mash A into the fermentation chamber and closed for the pressurized fermentation process. Alternatively, rather than a valve 26, it is possible to have any means of opening and closing inlet 6, such as a port door, one-way valve, etc.

Figure 3A:
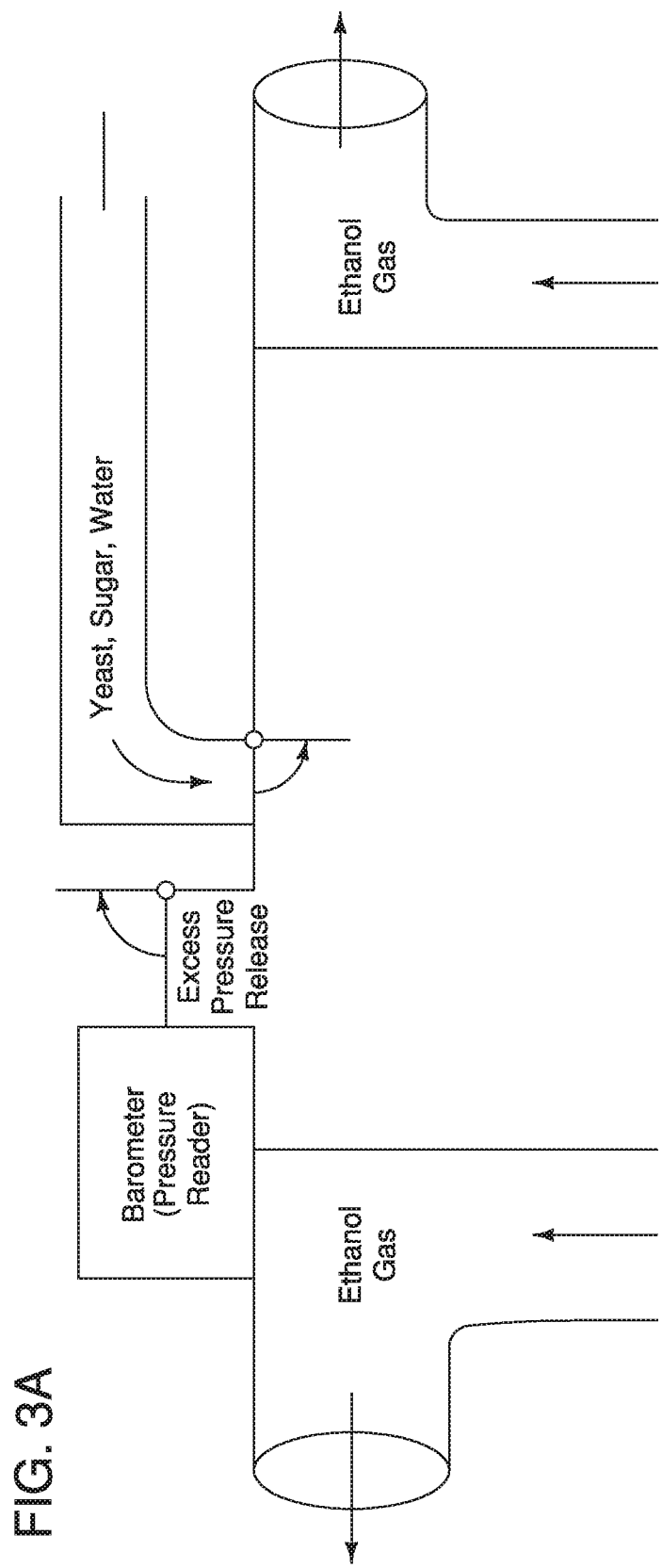
FIG. 3A is a detailed view of section 3A of FIG. 3.
Figure 3B:
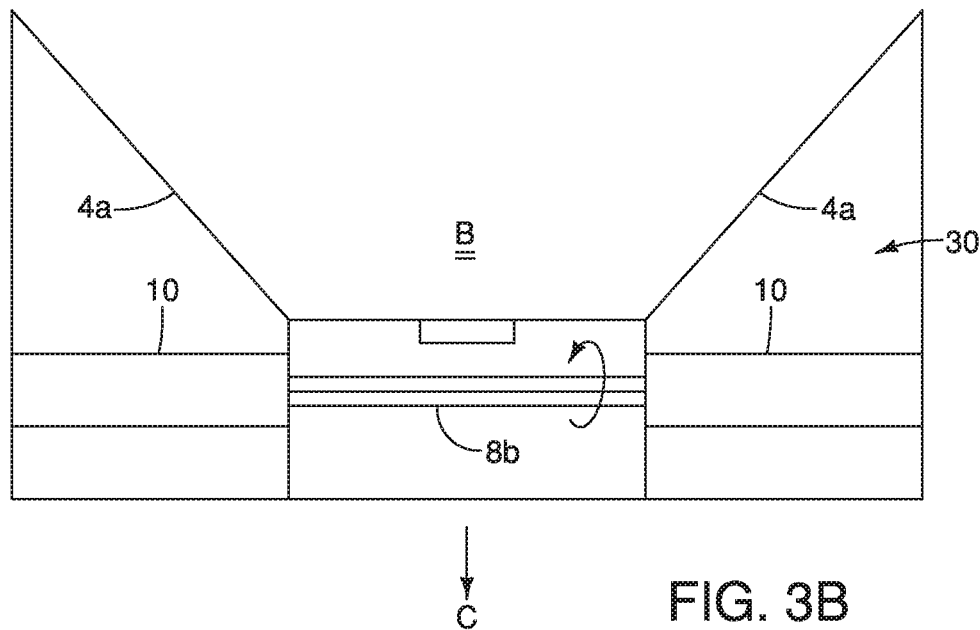
FIG. 3B is a detailed view of section 3B of FIG. 3.
Figure 3C:
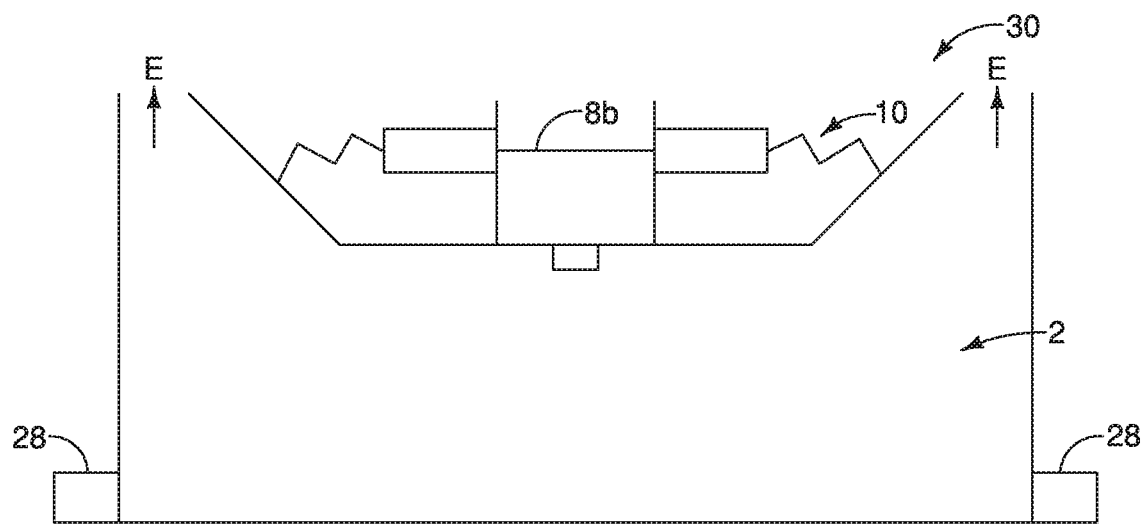
FIG. 3C is a detailed view of section 3C of FIG. 3.

The fermentation chamber 4 is sealed for period of time. In an optional embodiment depicted in FIG. 3A, the fermentation chamber 4 may be fitted with a barometer to take pressure readings. As depicted also in FIG. 3A and FIG. 2, a pressure safety valve 24 may also be provided on fermentation chamber 4 to release pressure if the pressure inside exceeds maximum or safe pressures of operation.

The process of fermentation produces heat and pressure. Heat is transferred to the distillation vessel 2 via the conductive sidewall 20 of the fermentation chamber 4. The pressurized fermented mash, which has now produced ethanol D as a fermentation product, then flows out of the fermentation chamber 4, preferably by gravity. The dual action of the force of gravity and the force of the pressurized fermented mash/ethanol mixture B drives turbine 8, which preferably has a spindle rotor 8a or an impeller.

Figure 4A:
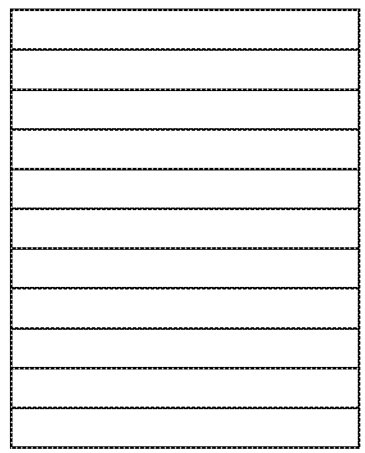
FIG. 4A (i) is a top plan view of the spindle arms of one embodiment of the present invention.
Figure 4A:
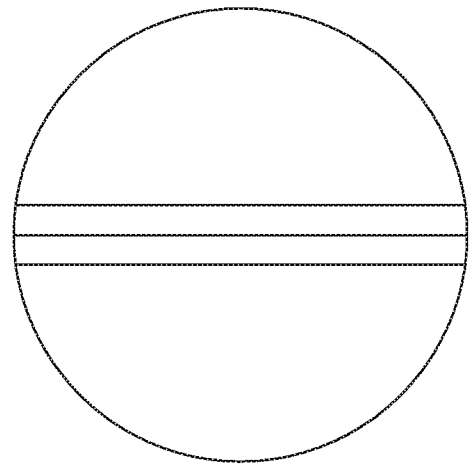
Figure 4B:
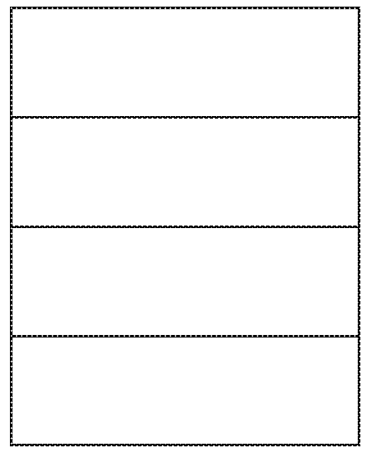
FIG. 4B (i) is a top plan view of the impeller of one embodiment of the present invention.
Figure 4B:
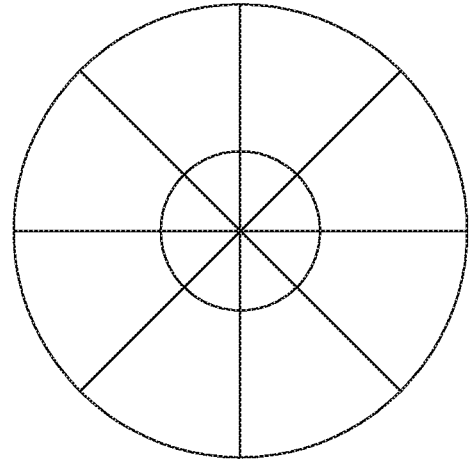

As depicted in FIGS. 4A to 4C, the turbine rotors may for example have either vertical spindles 8a or horizontal impellers 8b.

The generators 10 produce energy which may be fed back into a start-up battery or may be stored and used in other parts of the system. In one example the energy generated from the flowing fermented mash/ethanol mixture B may be used to add additional heat to the distillation vessel 2.

Fermented mash/ethanol B in the distillation chamber 2 is heated by heat transfer from the fermentation process to distill ethanol D from the fermented mash. With reference to FIG. 1B, the distilled ethanol D travels as evaporate in direction E and may be collected from one or more vapour outlets 16 formed at the top of the distillation vessel 2. Preferably, the distillation vessel is heated to about 70 to 85° C., and preferably to 80° C., to distill the ethanol D and evaporate it off.

At the end of the distillation process, waste mash A including, water and unused yeast and sugar may be collected from lower ports 28 on the distillation vessel 2 and may be disposed of or recycled back into the process to be added to the original mash A for fermenting. The waste mash A may be drained, flushed out of the lower ports 28, pumped out, or removed by other suitable means.

Methods of using the presently singular fermentation/distillation unit 100 include a continuous batch process wherein, as one batch of fermented mash/ethanol mixture B is in the distillation vessel 2 being distilled, is another batch of mash A is being fermented in the fermentation chamber 4. Fermentation time is commonly longer than distillation time, however fermentation times may be varied by varying the strains of yeast in the mash, as well as varying fermenting operating conditions. For an initial batch of mash A to be fermented it may be necessary to cool down the fermentation chamber 4 in addition to the cooling effect of the heat transfer via the sidewall 8 to the distillation vessel 2. In some cases, such cooling may be done by adding cool water to the mash A as it is being fermented. In other embodiments, a cooling coil (not shown) flowing a cooling medium such as glycol or water may be coiled around the sidewall 20 to collect excess heat at any times when fermentation is occurring but distillation is not. Such coils may be made of a conductive material similar to the sidewalls 20 of the fermentation chamber 4, such that they do not impair heat transfer to the distillation vessel 2. Heat captured by a cooling fluid may optionally be stored and circulated around the distillation vessel 2 if any additional heating of the distillation vessel is required.

The present invention combines the fermentation chamber 4 and distillation vessel 2 into a single apparatus, so as to reduce the overall energy required to accomplish the fermentation and distillation. By capturing waste heat energy generated by the fermentation process and transferring that waste heat energy to the distillation process, the amount of energy required to cool the fermentation chamber 4 is reduced, as is the amount of energy required to distill the resulting water/alcohol mixture. Once fermentation is complete, allowing the fermented and pressurized mash/alcohol/water mixture to fall and/or flow under pressure through a turbine 8 generates electrical energy from generator 10. This electrical energy may be used for cooling the fermentation process, heating the distillation process, and/or be stored and applied to power some other portion of the production plant, thereby further reducing the overall amount of energy required to produce the alcoholic beverage or other product.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A device comprising;
   a) a fermentation chamber having one or more inlets to receive a mixed stream of mash or mulch to be fermented in the fermentation chamber and an outlet to release the mixed stream, once fermented, as fermented product;
   b) a distillation vessel surrounding the fermentation chamber having communication with the fermentation chamber outlet to receive fermented product to be distilled in the distillation vessel; and
   c) a turbine cooperating with the outlet of the fermentation chamber, said turbine having one or more rotors rotatable by force of flow of the fermented product thereof flowing from the fermentation chamber to the distillation vessel, to generate electricity;
wherein a sidewall of the fermentation chamber is a shaped sidewall common to both the fermentation chamber and the distillation vessel to optimize heat transfer of heat generated from the fermentation of the fermented product to the distillation vessel to heat the fermented product to be distilled in the distillation vessel.

2. The device of claim 1, wherein the shared sidewall includes copper.

3. The device of claim 1, wherein a generator is housed in a generator chamber located within the fermentation chamber, but isolated from any contact with the mixed stream or fermented product.

4. The device of claim 3, wherein the generator is adjacent to the rotors and below the fermentation chamber outlet.

5. The device of claim 3 wherein the generator is hollow and the turbine is nested within the generator so as to drive the generator.

6. The device of claim 3, wherein the rotors are in the form of vertical spindles which are rotatable by force of flow of the fermented product, said rotation being convertible into electrical energy by the generators.

7. The device of claim 3, wherein the rotors are in the form of horizontal impellers which are rotatable by downwards flow of the fermented product, said rotation being convertible into electrical energy by the generators.

8. The device of claim 3, further comprising a battery and wherein electrical energy producible by the generator is stored in the battery.

9. The device of claim 3, wherein electrical energy producible by the generator is adapted to be used as an additional heat source to the distillation vessel.

10. The device of claim 1, wherein the fermentation chamber outlet is located at a lower end of the fermentation chamber and the fermented product falls by force of pressure and by gravity through the turbine and into a lower receiving area of the distillation vessel.

11. The device of claim 1, further comprising a cooling system in connection with said fermentation chamber to collect heat when the fermentation chamber is being used and the distillation vessel is not being used.

12. The device of claim 1, wherein the cooling system comprises cooling coils coiled around the sidewall of the fermentation chamber, for flowing a cooling medium therethrough.

13. A method of fermenting and distilling a product, said method comprising the steps of:
   a) receiving in a fermentation chamber a mixed stream to be fermented;
   b) transferring heat energy generated by fermentation to a distillation vessel surrounding the fermentation chamber;
   c) allowing pressurized fermented product to flow from the fermentation chamber into the distillation vessel via a turbine; and
   d) rotating a rotor of the turbine by a force of flow of the fermented product flowing to the distillation vessel to generate electricity.

14. The method of claim 13, further comprising generating the electricity in a generator.

15. The method of claim 14, flowing fermented product from the fermentation chamber outlet comprising allowing the fermented product to fall by gravity through the turbine and into a lower receiving area of the distillation vessel.

16. The method of claim 13, further comprising collecting heat from said fermentation chamber to when the fermentation chamber is being used and the distillation vessel is not being used.

17. The method of claim 13, further comprising storing heat for later circulation around the distillation vessel to add heating to the distillation vessel.

\* \* \* \* \*